United States Patent [19]

Uchida

[11] 4,313,142

[45] Jan. 26, 1982

[54] MODE CHANGING APPARATUS FOR A TAPE RECORDER

[75] Inventor: Hiroyuki Uchida, Yokohama, Japan

[73] Assignee: Sony Corporation, Tokyo, Japan

[21] Appl. No.: 86,535

[22] Filed: Oct. 19, 1979

[30] Foreign Application Priority Data

Oct. 25, 1978 [JP] Japan .......................... 53/145786[U]

[51] Int. Cl.³ ........................ G11B 5/54; G11B 15/10; G11B 15/24

[52] U.S. Cl. .................................. 360/105; 310/156; 360/90; 360/96.3

[58] Field of Search .......... 360/105, 90, 93, 74.1–74.2, 360/96.3; 310/83, 49 R, 156, 181; 74/210, 74, 827; 242/208–210

[56] References Cited

U.S. PATENT DOCUMENTS

| | | | |
|---|---|---|---|
| 3,550,983 | 12/1970 | Probst et al. | 360/105 |
| 3,810,211 | 5/1974 | Murata | 360/105 |
| 3,860,964 | 1/1975 | Kozu et al. | 360/105 |
| 4,052,742 | 10/1977 | Pastor | 360/105 |
| 4,097,755 | 6/1978 | Kitai | 310/156 |
| 4,167,764 | 9/1979 | Hanajima et al. | 360/90 |

*Primary Examiner*—Alfred H. Eddleman
*Attorney, Agent, or Firm*—Lewis H. Eslinger; Alvin Sinderbrand

[57] ABSTRACT

A mode changing apparatus for a tape recorder to initiate a change in mode including a loading gear having at least a portion magnetized in N and S poles and an electromagnet adjacent to the magnetized portion of the loading gear. When a trigger signal is applied to the electromagnet responsive to the selection of a mode of operation for the tape recorder, the loading gear is brought into meshing engagement with a drive gear. The drive gear is driven and disposed so it does not mesh with the loading gear until the electromagnet is energized. Once the electromagnet is energized to engage the drive gear and loading gear the rotation of the loading gear effects the mode change of the tape recorder.

7 Claims, 7 Drawing Figures

MODE CHANGING APPARATUS FOR A TAPE RECORDER

BACKGROUND OF THE INVENTION

1. Field of the Invention

This invention relates generally to tape recorders and, more particularly, is directed to an improved apparatus to change the operating modes of a tape recorder by means of a feather touch push button operating through a trigger motor and which is suitable for use in battery operated portable tape recorders.

2. Description of the Prior Art

In prior art mode changing mechanisms for tape recorders solenoids are employed for each selected mode of operation, for example to move a head carriage assembly or for pinch roller displacement. These solenoids when activated require a constant current supply during the record or reproducing mode of the recorder. Since the solenoids used in these recorders are relatively large in order to maintain the head and pinch roller in operative position the current drain is inordinately large.

To obviate the disadvantage of the current drain incident with the use of solenoids, there has been proposed a mode changing apparatus wherein the solenoid is used only to effect a light triggering operation, i.e., the solenoid acts only as a trigger to convey the rotational output of a motor to an operating mode changing apparatus. Such a mechanism is disclosed in U.S. Pat. No. 4,167,764. The mechanism in the aforesaid patent has successfully reduced current loads and has permitted use of smaller solenoids than were employed in mode changing mechanisms theretofore so that power consumption was reduced.

However, in general where a portable tape recorder operating on dry cell batteries as a power supply is used, the reduction in the power consumption using the mechanism of the aforesaid patent is still not enough in order to obtain prolonged battery life.

OBJECTS AND SUMMARY OF THE INVENTION

Accordingly, it is an object of this invention to provide a mode changing apparatus for a tape recorder which is operable to effect mode change without use of solenoids and at a low power drain.

It is a further object of the present invention to provide a mode changing apparatus of the feather touch push button type wherein the slight depression of the feather touch push button initiates a trigger response to mesh a drive gear with the mode change apparatus to initiate a mode change.

A still further object of the present invention is to provide a mode changing apparatus for use in portable battery operated tape recorders which is relatively compact, light in weight and inexpensive to construct.

In accordance with an aspect of this invention a mode changing apparatus for a tape recorder is provided with a loading gear member made of a permanent magnet material and having a cutout therein. A continuously rotating drive gear operatively connected to the tape recorder drive motor is disposed adjacent the loading gear and rotates within the cutout portion of the loading gear so that the drive gear is not in meshing engagement with the loading gear. An excitable electromagnet is provided about the loading gear so that when a trigger current is introduced in the electromagnet, the magnetic flux induced rotates the loading gear to mesh it with the drive gear which drives the loading gear to effect a mode change in the tape recorder.

The above and other objects, features and advantages of the invention will be more readily apparent in the following detailed description of illustrative embodiments thereof which is to be read in connection with the accompanying drawings.

DETAILED DESCRIPTION OF THE PREFERRED EMBODIMENTS

Figure 1:
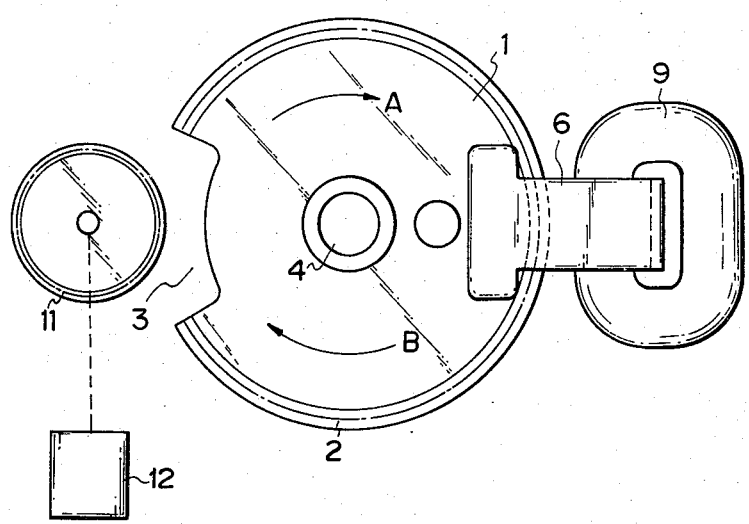
FIG. 1 is a top plan diagrammatic representation of the drive gear and loading gear of the embodiment of the mode change apparatus of the present invention.
Figure 2:
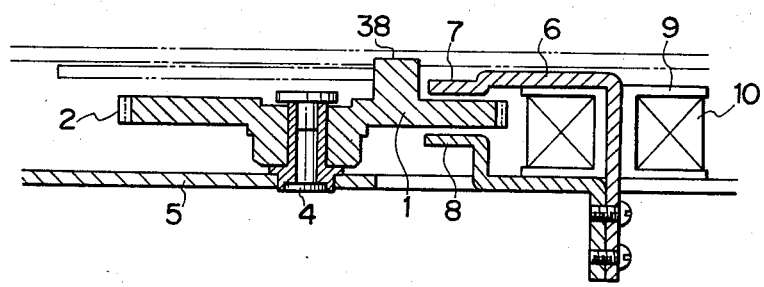
FIG. 2 is an elevational view of the apparatus shown in FIG. 1.
Figure 3:
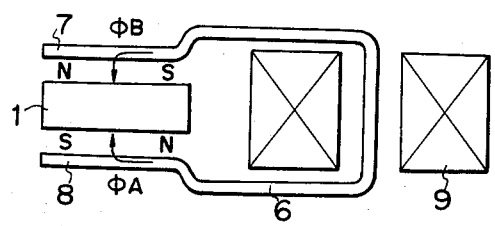
FIG. 3 is a diagrammatic representation of the electromagnetic system used as a trigger device in the mode changing apparatus of the present invention.

Referring now to FIGS. 1 to 3 of the drawings, there is shown an assembly for the trigger mechanism to initiate a mode change in a tape recorder which includes a loading gear member 1 made of a permanent magnet material. Gear 1 includes a toothed peripheral segment 2 and a cutout segment 3 without gear teeth. Gear 1 is rotatably fixed on a shaft 4 mounted on the player chassis 5. A yoke 6 with yoke arms 7 and 8 disposed about loading gear 1 and a coil bobin 9 having an exciting coil 10 wound thereabout is provided for triggering a mode changing operation.

Loading gear 1 is magnetized in the direction of the thickness of gear 1 as indicated in FIG. 3 and when coil 10 is energized by a pulsed d.c. current so as to generate a flux $\Phi_A$ in yoke 6 loading gear 1 is driven to rotate in a direction indicated by the arrow A in FIG. 1. When coil 10 is energized by a pulsed d.c. current of opposite polarity so as to generate a flux $\Phi_B$ in yoke 6, loading gear 1 is driven to rotate in the opposite direction indicated by the arrow B in FIG. 1.

Upon rotation of gear 1 responsive to the pulsed excitation of coil 10, the toothed segment 2 of gear 1 moves into meshing engagement with a drive gear 11 driven by a drive motor 12, which may be the main rotating power source for the tape recorder. Thus, cutout portion 3 of loading gear 1 should be located in a position adjacent drive gear 11 but not in meshing engagement therewith until loading gear 1 is rotated by excitation of coil 10.

Upon engagement of loading gear 1 with drive gear 11, the drive gear 11 under the rotative force of motor 12 supplies the power source to effect a mode changing operation, as will be explained more fully hereinbelow. Thus, to initiate a mode changing operation, only a triggering pulsed current to coil 10 need be supplied sufficient to rotate loading gear 1 into meshing engagements with drive gear 11.

Figure 4:
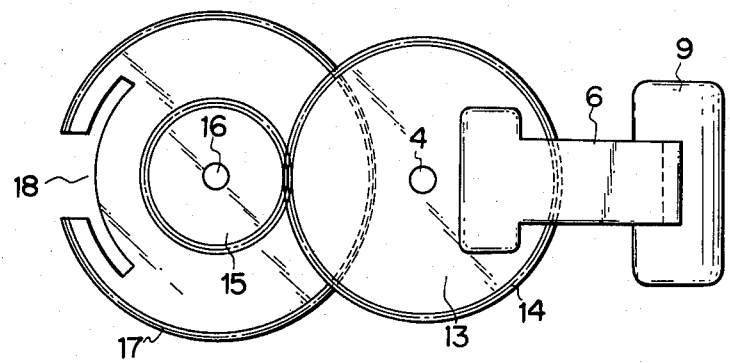
FIG. 4 is a top plan diagrammatic representation similar to FIG. 1 of an alternate embodiment of the present invention.

Reference is now made to FIG. 4 for an alternate embodiment for the loading gear of the present invention. In this embodiment the loading gear 13 made of a permanent magnet material has a full gear toothed periphery 14 which is in meshing engagement with a gear 15 disposed on a shaft 16 rotatably mounted on the chassis. A gear 17 having a cutout segment 18 is also secured to shaft 16 and rotates as gear 15 and shaft 16 are rotated. Gear 17 with cutout 18 is disposed adjacent a drive gear (not shown) as in the embodiment of FIG. 1.

Thus as the coil about bobbin 9 is excited, loading gear 13 is driven to drive gear 17 into meshing engagement with the drive gear. With the embodiment of FIG. 4, the gear members 15 and 17 may be made of nonmagnetic materials such as synthetic resins and the like.

Figure 5:
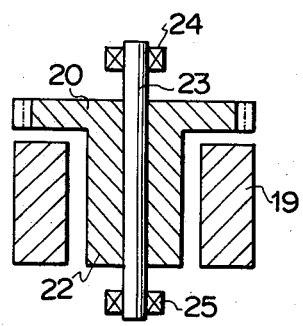
FIG. 5 is a diagrammatic elevational view of another embodiment of the loading gear and electromagnet system of the present invention.
Figure 6:
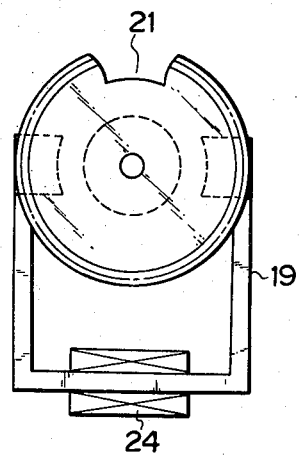
FIG. 6 is a diagrammatic plan view of the embodiment of FIG. 5.

FIGS. 5 and 6 show another alternate embodiment where a U-shaped yoke 19 is disposed about a loading gear 20 of magnetic material having a cutout segment 21 and an extending shoulder segment 22 disposed within the arms of yoke 19. Gear 20 is fixed to a shaft 23 rotatably disposed within bearings 24 and 25 at each end. A coil 26 is provided about yoke 19 to induce flux to rotate loading gear 20. As in the other embodiments, rotation of loading gear 20 results in the meshing engagement of the gear teeth of gear 20 with a drive gear (not shown).

Figure 7:
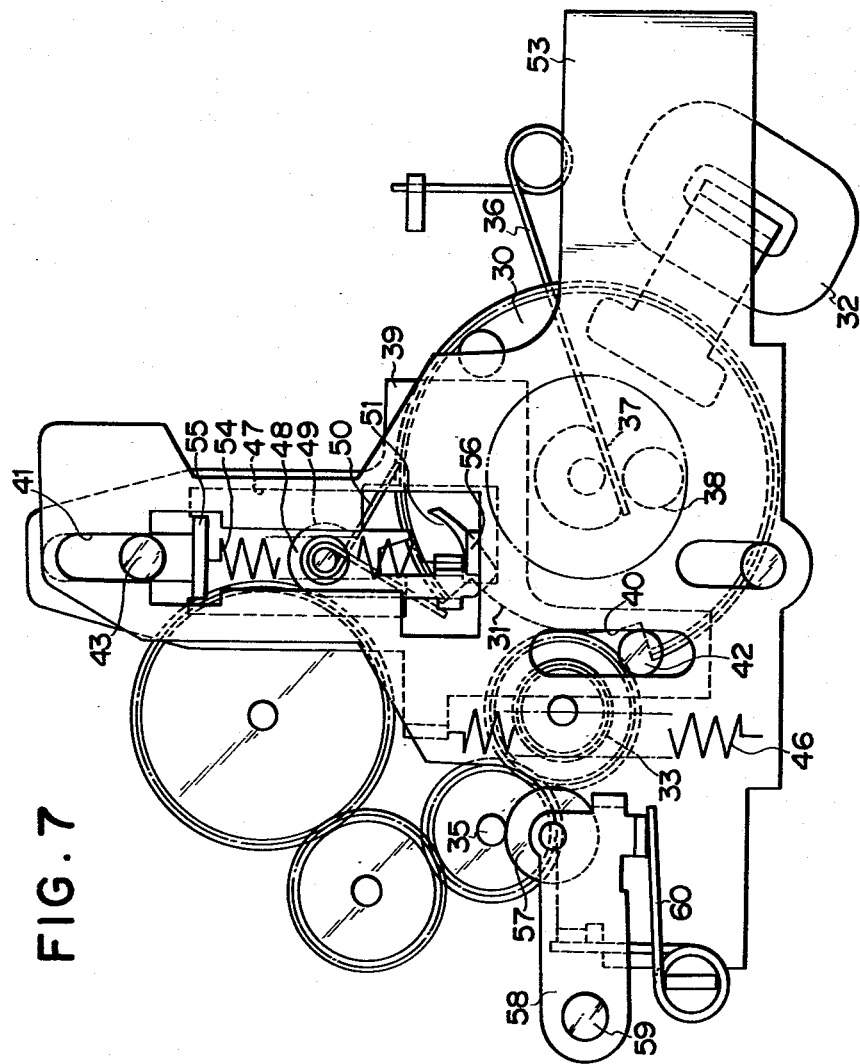
FIG. 7 is a plan view of the mode changing apparatus of the present invention depicted in the environment of a tape recorder.

Reference is now made to FIG. 7 for a description of the mode changing apparatus of the present invention where any of the embodiments of FIGS. 1 to 6 may be employed to rotate the loading gear to initiate a mode changing operation.

As shown in FIG. 7, a loading gear 30 having a cutout segment 31 is provided for rotation by excitation of a coil 32 in the same manner described above. A drive gear 33 is positioned adjacent cutout 31 to be engageable with the teeth on loading gear 30 when loading gear 30 is rotated upon excitation of its coil 32. Drive gear 33 is driven by a gear 34 fixed to capstan shaft 35.

A positioning spring 36 is provided having one end 37 bearing against a loading pin 38 extending from loading gear 30 (see FIG. 2 as well) to maintain loading gear 30 in its disengaged position with respect to drive gear 33 until a triggering pulse of current rotates loading gear 30 into engagement with the drive gear.

Loading pin 38 also acts to move a loading base plate 39 when loading gear 30 is engaged and driven by drive gear 33. Loading base plate 39 is disposed for reciprocating movement within the recorder by being provided with guide slots 40 and 41 which receive guide pins 42 and 43, respectively, extending from the chassis and by a guide pin 44 bearing against a lateral edge 45 of loading base plate 39.

Loading base plate 39 is normally urged downwardly, as viewed in FIG. 7, by a coiled spring 46 fixed at one end to the base plate 39 and at its other end to the chassis. Loading base plate 39 also includes a cutout segment 47 within which is disposed one end 48 of a lock lever 49 which is urged by a spring 50 to move lock lever 49 into engagement with loading base plate 39 in its upward position, as viewed in FIG. 7, after it has been moved responsive to the rotation of loading gear 30 due to the engagement of the loading gear with drive gear 33.

Before loading, i.e. before a pulse trigger current excites coil 32 to rotate loading gear 30, drive gear 33 is rotated by the main power source but, since cutout 31 confronts drive gear 33, no rotative force is imparted to loading gear 30. When a trigger pulse for clockwise (as viewed in FIG. 7) rotational displacement for loading gear 30 is initiated responsive to a light feather touch to an operating mode selecting push button (not shown) for the recorder, loading gear 30 is rotated into meshing engagement with driven gear 33 and is rotated by driven gear 33. With this driven rotation of loading gear 30, loading pin 38 moves into contact with loading base plate 39 and the base plate is moved upwardly (as viewed in FIG. 7) by the action of the rotating loading pin 38 in contact with loading base plate 39. The loading base plate 39 is subjected to its maximum displacement with one half revolution of loading gear 30, i.e. when loading pin 38 is displaced 180° from the position shown in FIG. 7. At this juncture, a bent tab 51 extending from loading base plate 39 is engaged by an extending tab 52 on lock lever 49 to lock the loading base plate 39 in its upper displaced position. Loading gear 30 continues to be driven by drive gear 33 until it returns to its initial position where cutout 31 confronts drive gear 33 and no further rotative force is imparted to the loading gear 30.

With the upward (as viewed in FIG. 7) movement of loading base plate 39 a head carriage support plate 53 is moved to a recording and/or reproducing position through the urging of a coil spring 54 connected at one end to a projection 55 on the loading base plate 39 and a projection 56 on the head carriage support plate 53.

The same upward movement (as viewed in FIG. 7) of loading base plate 39 and head carriage support plate 53 moves a pinch roller 57 which is rotatably mounted on a pinch roller arm 58 into contact with capstan shaft 35. Pinch roller arm 58 is pivotally supported on a guide post 59 and is urged into engagement with capstan 35, to pinch magnetic tape therebetween, by the action of spring 54 urging head carriage support plate 53 and a spring 60 acting against the pinch roller arm 58.

To release the lock on loading base plate 39, a trigger pulse of current is again applied rotating loading gear 30 into engagement with drivegear 33 to rotate loading gear 30 until loading pin 38 again contacts loading base plate 39. This contact moves loading base plate 39 slightly releasing the lock from lock lever 49 and loading base plate 39 returns to its initial disengaged position under urging of spring 46. With this movement of loading base plate 39 head carriage support plate 53 and pinch roller 57 also retract from the engaged play position.

It is thus seen that the present invention provides a compact single motor tape recorder where selected operating modes are effected by a feather touch mode selecting push button without requiring use of solenoids. As is apparent from the foregoing description, the mode selecting operation results from the application of a pulsed trigger signal of short duration to initiate displacement of a loading gear member into operative engagement with the main drive system powered by the recorder's single motor. Thus an external signal of low power drain effectively provides a limited degree of rotational movement. Use of the low power signal has the advantage that rotational direction can be freely selected permitting a wide range of application for the trigger mechanism of this invention which is more advantageous than prior art devices using a single direction input from a solenoid type device.

In addition, it is also readily apparent that the changeover mechanism of the present invention can be readily adapted to varying size depending upon the size or characteristic of the operating mechanism employed and that the changeover mechanism is relatively simple to manufacture and assemble and can be manufactured at relatively reasonable cost.

I claim:

1. A mode changing apparatus adapted for use in a tape recorder comprising:

a rotatably supported loading gear having at least a portion magnetized in N and S poles;

electromagnet means operatively associated with said portion of said magnetized loading gear whereby energization of said electromagnet means induces a magnetic flux to impart rotation to said loading gear;

said electromagnet means including a yoke member and a coil wound around said yoke member and wherein said yoke member is disposed adjacent to said magnetized portion of said loading gear;

a drive gear member positioned to drivingly engage said loading gear when said loading gear has been rotated responsive to energization of said electromagnet means; and said loading gear including a toothed peripheral segment and a cutout segment without peripheral gear teeth and wherein said cutout segment is located adjacent said drive gear member when said electromagnet means is not engaged with said loading gear and wherein said toothed peripheral segment of said loading gear rotates into meshing engagement with said drive gear member upon energization of said electromagnet means.

2. A mode changing apparatus according to claim 1 further comprising an intermediate gear member interposed between said loading gear and said drive gear member, said intermediate gear member including a toothed peripheral segment and a cutout segment without peripheral gear teeth and wherein said toothed peripheral segment is in meshing engagement with said loading gear and said cutout segment is located adjacent said drive gear member when said electromagnet means is not energized whereby said drive gear member is not engaged with said intermediate gear member and wherein said toothed peripheral segment of said intermediate gear member rotates into meshing engagement with said drive gear member upon energization of said electromagnet means.

3. A mode changing apparatus according to claim 2 wherein said intermediate gear member is made of a synthetic resin material.

4. A mode changing apparatus according to claim 1 further including drive means to rotate said drive gear member and means to supply a trigger signal current to said electromagnet means to initiate rotation of said loading gear in a predetermined direction of rotation.

5. A mode changing apparatus for use in a tape recorder comprising:

a rotatably supported loading gear;

a drive gear member;

said loading gear being rotatable from a first position disengaged from said drive gear member to a second position in meshing engagement with said drive gear member whereby continued rotation of said loading gear member is responsive to the rotative force of said drive gear member;

said loading gear member having at least a portion magnetized in N and S poles;

means to initiate rotation of said loading gear from its said first position to its said second position comprising electromagnet means operatively associated with said magnetized portion of said loading gear whereby energization of said electromagnet means induces a magnetic flux to impart rotation to said loading gear to bring said loading gear into meshing engagement with said drive gear member;

a loading base plate member disposed for sliding reciprocable movement within said recorder from a first position to a second position;

means on said loading gear adapted to contact said loading base plate member upon said continued rotation of said loading gear by said drive gear member to initiate movement of said loading base plate member from its said first position to its said second position;

said recorder further including a head carriage assembly and a pinch roller assembly each movable from a first inactive position to a second active position in operational play relationship within said recorder; and said head carriage assembly and said pinch roller assembly movable from their respective first positions to their respective second positions responsive to movement of said loading base plate member from its said first position to its said second position.

6. A mode changing apparatus according to claim 5 wherein said electromagnet means includes a yoke member and a coil wound around said yoke member and wherein said yoke member is disposed adjacent to said magnetized portion of said loading gear.

7. A mode changing apparatus according to claim 5 wherein said loading gear includes a toothed peripheral segment and a cutout segment without peripheral gear teeth and wherein said cutout segment is located adjacent said drive gear member when said electromagnet means is not energized whereby said drive gear member is not engaged with said loading gear and wherein said toothed peripheral segment of said loading gear rotates into meshing engagement with said drive gear member upon energization of said electromagnet means.

* * * * *